United States Patent
Liu

(10) Patent No.: US 8,554,058 B2
(45) Date of Patent: Oct. 8, 2013

(54) ELECTRONIC DEVICE AND METHOD FOR PLAYING MULTIMEDIA FILES

(75) Inventor: Tien-Ping Liu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 11 days.

(21) Appl. No.: 13/282,478

(22) Filed: Oct. 27, 2011

(65) Prior Publication Data

US 2013/0077933 A1    Mar. 28, 2013

(30) Foreign Application Priority Data

Sep. 27, 2011   (TW) .............................. 100134719 A

(51) Int. Cl.
*H04N 5/76*   (2006.01)

(52) U.S. Cl.
USPC ........................................................ 386/293

(58) Field of Classification Search
None
See application file for complete search history.

(56) References Cited

U.S. PATENT DOCUMENTS

2009/0279869 A1*  11/2009  Ogawa et al. ................. 386/104

\* cited by examiner

*Primary Examiner* — William C Vaughn, Jr.
*Assistant Examiner* — Daniel Tekle
(74) *Attorney, Agent, or Firm* — Altis & Wispro Law Group, Inc.

(57) ABSTRACT

An electronic device for playing multimedia files includes a storage unit, an input unit, a control unit, and a play unit. The storage unit stores a number of multimedia files. The control unit determines whether two or more multimedia files are selected to play according to signals from the input unit, determines types of the selected multimedia files if two or more multimedia files are selected, and controls the play unit to play the selected multimedia files according to a priority each type of multimedia files is assigned if the selected multimedia files have different types.

6 Claims, 3 Drawing Sheets

ELECTRONIC DEVICE AND METHOD FOR PLAYING MULTIMEDIA FILES

BACKGROUND

1. Technical Field

The present disclosure relates to electronic devices and, more particularly, to an electronic device and a method capable of playing multimedia files.

2. Description of Related Art

If different types of multimedia files, for example a video file and an audio file, are simultaneously or nearly simultaneously selected to be played by a multimedia player, the multimedia player may not respond if the multimedia player determines that playing the selected multimedia files simultaneously occupies the same system resource, for example audio output.

Therefore, what is needed is an electronic device and a method for playing multimedia files to solve the problem described above.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
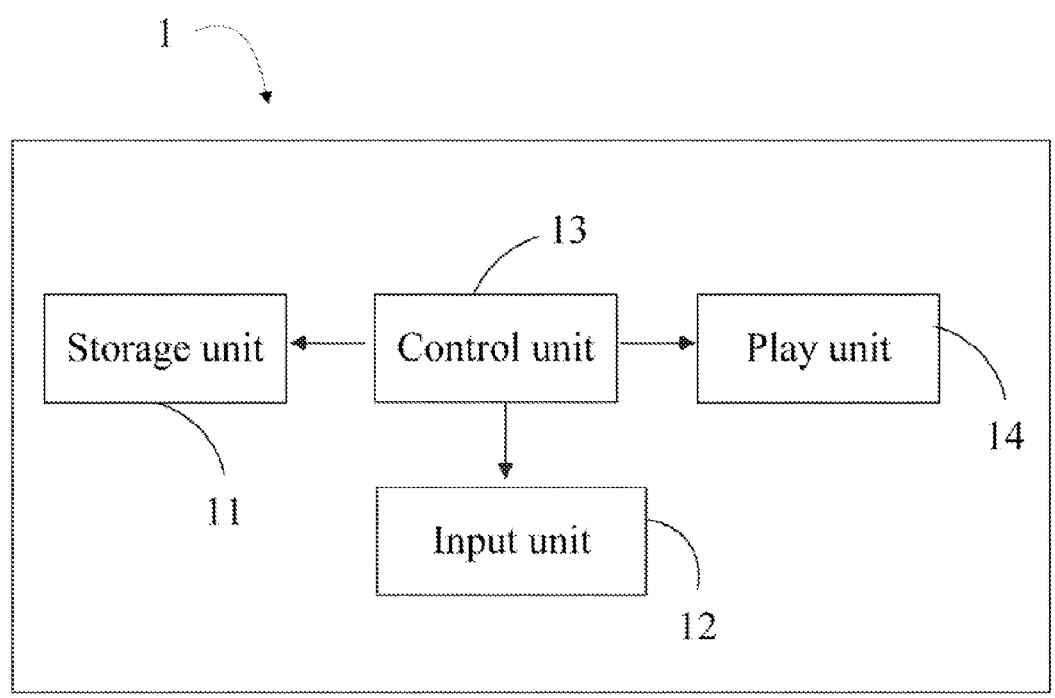
FIG. 1 is a block diagram of an electronic device, in accordance with an embodiment.

FIG. 1 is a block diagram of an electronic device 1 capable of playing multimedia files selected by users according to an exemplary embodiment. The electronic device 1 may be a computer, a media player, or a mobile phone. The selected multimedia files played by the electronic device 1, including graphic files, video files, and audio files, are simultaneously selected or nearly simultaneously selected in quick succession, for example, within two seconds. In the embodiment, each type of the selected multimedia files is assigned a priority. When the multimedia files having a same priority are selected to be played, the electronic device 1 may play the selected multimedia files in random order or according to file sizes, file names, or creation times of the selected multimedia files. When the multimedia files having different priorities are selected to be played, the electronic device 1 first plays the multimedia file with the highest priority, and subsequently plays the multimedia file with the lower priority. In this embodiment, the priority of the video files is higher than that of the graphic files or the audio files, and the priorities of the graphic files and the audio files are the same. When a video file and an audio file are selected to be played, the electronic device 1 first plays the video file, and subsequently plays the audio file after finishing playing the video file. When an audio file and a graphic file are selected to be played, the electronic device 1 simultaneously plays the audio file and the graphic file.

Figure 2:
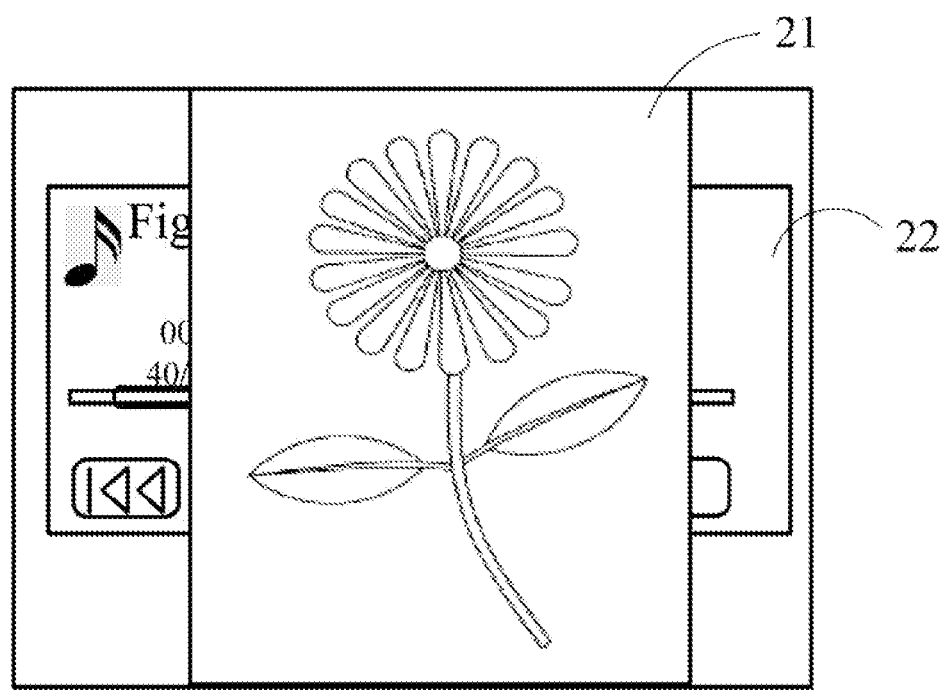
FIG. 2 is a schematic view showing an image file and an audio file are simultaneously played by the electronic device of FIG. 1, in accordance with an embodiment.

The electronic device 1 includes a storage unit 11, an input unit 12, a control unit 13, and a play unit 14. The storage unit 11 stores a variety of multimedia files. The input unit 12 is for users to select one or more than one multimedia files to be played. The control unit 13 determines whether one or more than one multimedia file is selected. If only one multimedia file is selected, the control unit 13 informs the play unit 14 to play the multimedia file. If two or more multimedia files are selected, the control unit 13 determines the types of the selected multimedia files, and controls the play unit 14 to play the selected multimedia files according to the determined types of the selected multimedia files. The play unit 14 outputs audio content of a currently played multimedia file through an audio port (not shown) of the electronic device 1, and outputs image content of the multimedia file on a screen (shown in FIG. 2) of the electronic device 1.

In this embodiment, if the selected multimedia files have a same type, for example, the selected multimedia files are audio files, the control unit 13 controls the play unit 14 to play the selected multimedia files in sequence according to a first playing order. In this embodiment, the first playing order may be playing the multimedia files according to file sizes, file names, or creation times of the multimedia files. For example, a smallest selected multimedia file may be played first. In an alternative embodiment, the control unit 13 may control the play unit 14 to play the selected multimedia files in random order.

If the selected multimedia files have different types, the control unit 13 controls the play unit 14 to play the selected multimedia files in sequence according to a second playing order. In this embodiment, as described above, the second playing order is playing the multimedia files in sequence according to the priorities of the selected multimedia files. The selected multimedia files with the highest priority may be played first. If the multimedia files having the same priority are selected to play, for example, a graphic file and an audio file, the control unit 13 controls the play unit 14 to simultaneously play the graphic file and the audio file. When a video file, a graphic file, and an audio file are selected to play, the control unit 13 controls the play unit 14 to first play the video file, and then when done with that, to simultaneously play the graphic file and the audio file.

In this embodiment, if the control unit 13 controls the play unit 14 to play a graphic file and an audio file simultaneously, the control unit 13 may control the play unit 14 to simultaneously output a graphic window 21 displaying the graphic file and an audio window 22 displaying a playing progress of the audio file on the screen. For example, the graphic window 21 is displayed on a top layer overlapping the audio window 22 (see FIG. 2). Alternatively, the control unit 13 may output the graphic window 21 on the screen and hide the audio window 22.

Figure 3:
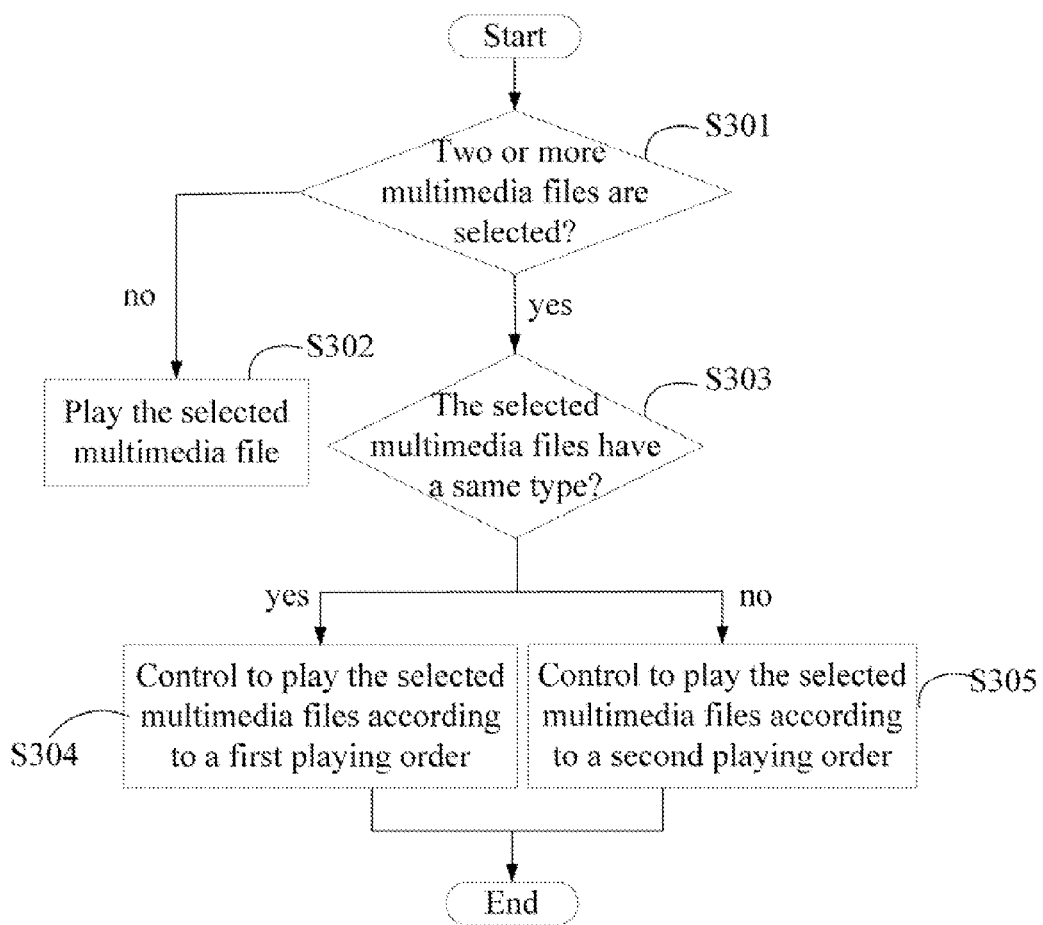
FIG. 3 is a flowchart of a method for playing multimedia files, in accordance with an embodiment.

FIG. 3 is a flowchart of a method of displaying multimedia content implemented by the electronic device 1 of FIG. 1 according to an exemplary embodiment.

In step S301, the control unit 13 determines whether two or more multimedia files are selected to be played. If no, the procedure goes to step S302, otherwise the procedure goes to step S303.

In step S302, the control unit 13 informs the play unit 14 to play the selected multimedia file.

In step S303, the control unit 13 determines whether the selected multimedia files have a same type. If yes, the procedure goes to step S304, otherwise the procedure goes to step S305.

In step S304, the control unit 13 controls the play unit 14 to play the selected multimedia files according to the first playing order.

In step S305, the control unit 13 controls the play unit 14 to play the selected multimedia files according to the second playing order.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the appended claims.

What is claimed is:

1. An electronic device for playing multimedia files, comprising:
   a storage unit for storing a plurality of multimedia files comprising video files, audio files, and image files;
   an input unit;
   a play unit; and
   a control unit to determine whether two or more multimedia files are selected to play according to signals from the input unit, determine types of the selected multimedia files if two or more multimedia files are selected, and control the play unit to play the selected multimedia files according to a priority each type of the selected multimedia files is assigned if the selected multimedia files have different types;
   wherein the priority of the video files is higher than that of the audio files or the image files, and the priority of the audio files is the same as that of the image files, the control unit controls the play unit to play the selected multimedia file with the highest priority first, and play the selected multimedia files with a same priority simultaneously.

2. The electronic device as described in claim 1, wherein the control unit controls the play unit to output a graphic window displaying the image file and an audio window displaying a playing progress of the audio file simultaneously if the selected multimedia files comprise an image file and an audio file.

3. The electronic device as described in claim 2, wherein the graphic window is displayed on a top layer overlapping the audio window.

4. A method for playing multimedia files implemented by an electronic device comprising a control unit and a storage unit, the storage unit storing a plurality of multimedia files comprising video files, audio files, and image files, the method comprising:
   determining by the control unit whether two or more multimedia files are selected from the storage unit to play;
   determining by the control unit types of the selected multimedia files if two or more multimedia files are selected; and
   playing the selected multimedia files according to a priority each type of the selected multimedia files is assigned if the selected multimedia files have different types;
   wherein the priority of the video files is higher than that of the audio files or the image files, and the priority of the audio files is the same as that of the image files, the selected multimedia file with a highest priority is played first, and the selected multimedia files with a same priority are played simultaneously.

5. The method as described in claim 4, wherein an graphic window displaying the image file and an audio window displaying a playing progress of the audio file are simultaneously displayed if the selected multimedia files comprise an image file and an audio file.

6. The method as described in claim 5, wherein the graphic window is displayed on a top layer overlapping the audio window.

* * * * *